United States Patent Office 3,474,256
Patented Oct. 21, 1969

3,474,256
POWER SYSTEMS EMBODYING D.C. RING MAINS
Harry Hawley Begent, Stafford, England, assignor to The English Electric Company Limited, London, England, a British company
Filed Mar. 29, 1966, Ser. No. 538,427
Claims priority, application Great Britain, Apr. 20, 1965, 16,552/65
Int. Cl. H02j 1/10
U.S. Cl. 307—18       7 Claims

ABSTRACT OF THE DISCLOSURE

A direct current power system embodying two bi-polar ring mains with switch means disposed at various points along their length selectively to couple power sources and loads into and out of the circuit. Various isolators are also connected in the two ring mains to isolate selected sections.

Figure 1:
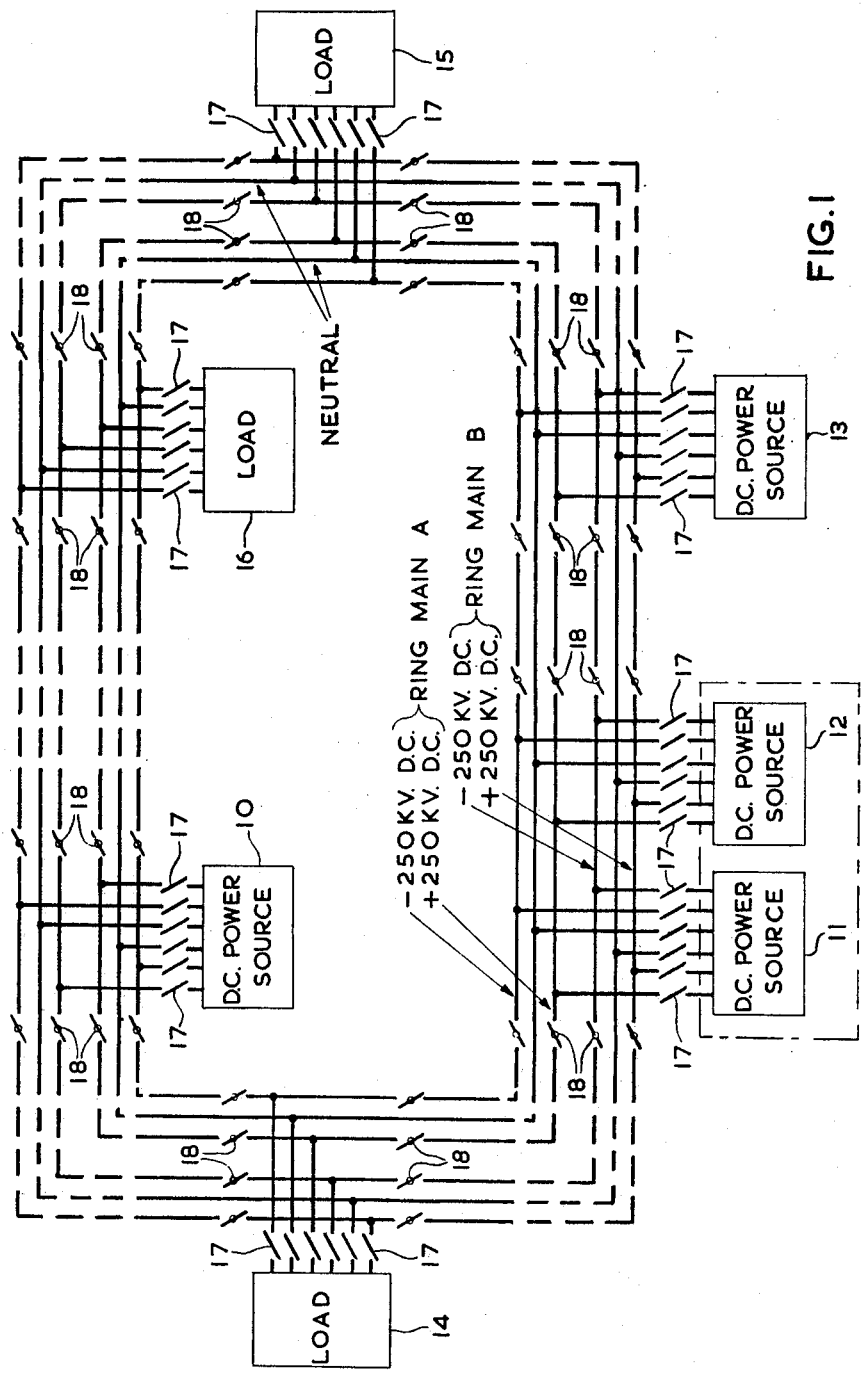

By employing this system a much greater security of supply may be obtained than with a comparable A.C. system embodying two ring mains, particularly where more than one fault or outage is present.

---

The invention relates to direct current power systems.

The present invention consists in a direct current power system comprising two ring-mains, first switch means for separately connecting each ring-main to a common load, second switch means for separately connecting each ring-main to a common D.C. power source and third switch means connected in corresponding positions in each ring-main and operable to isolate selected sections of each ring-main.

Preferably, the power source has one pole of positive polarity with respect to earth connected to one line in each ring-main and its other pole of negative polarity with respect to earth connected to another line in each ring-main. The power source may have a neutral point at earth potential, each ring-main being connected to this neutral point by an additional line or, if circumstances permit, through the ground.

Control means may be provided which are operable to prevent the supply of power from said source to both ring-mains prior to the isolation of a said section by the third switch means and subsequent to its reconnection, so that these switch means operate whilst the system is off-load.

This invention is particularly applicable to D.C. systems whose source of power is an A.C. system or systems and the conversion to D.C., and vice versa, is by controlled rectifiers whose conduction time is governed by grid control signals.

Compared with an equivalent "double" A.C. ring-main, this invention affords a much higher security or maintenance of supply under certain fault conditions, and in addition to the inherent advantages of high voltage D.C. transmission over A.C. the installation of a double D.C. ring-main is more economical than its A.C. counterpart. Furthermore, a high voltage D.C. ring-main may be cabled underground much more cheaply than A.C., and this is of particular importance since in many rural areas which are considered to be of outstanding natural beauty there is no alternative other than re-routing the supply.

As an example of the increased security or maintenance of supply afforded by this invention over an A.C. system employing a double ring-main reference is made to the following table:

| D.C. Double Ring Main | | | | | A.C. Double Ring Main | | |
|---|---|---|---|---|---|---|---|
| Line A | | Line B | | Capacity Available, Percent | Line A | Line B | Capacity Available, Percent |
| +ve | −ve | +ve | −ve | | | | |
| X  | X  | X  | X  | 100 | X  | X | 100 |
| XX | O  | O  | O  | 75  | XX | O | 50  |
| XX | X  | X  | X  | 75  | XX | X | 50  |
| XX | XX | O  | O  | 50  |    |   |     |
| XX | X  | XX | X  | 50  | XX | XX | 0  |
| XX | XX | XX | O  | 25  |    |   |     |
| XX | XX | XX | X  | 25  |    |   |     |
| XX | XX | XX | XX | 0   |    |   |     |

In this table O = healthy line; X = single fault on line; XX = double fault on line.

As can be seen from the table, these advantages of this invention arise in the event of there being more than one fault or outage for any other reason affecting one pole of a circuit, when the earth return can be brought into use. In addition, the temporary reduction in capacity which is necessary whilst the fault is isolated, which varies between 50% and 100% for a specified period, e.g. 15 milliseconds, is in many of the above cases less for the D.C. system than the A.C. system.

Figure 2:
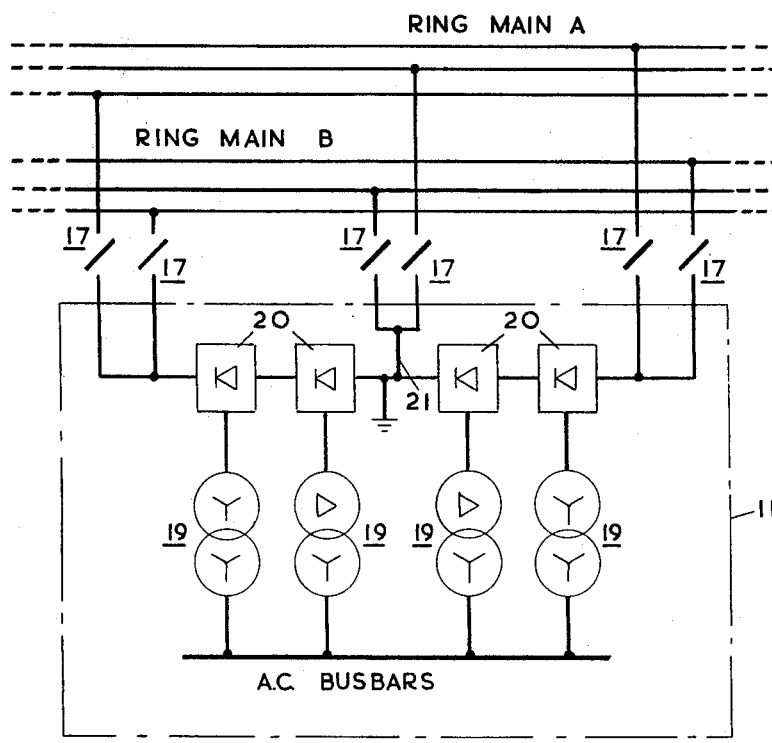

A high voltage direct current ring-main power system will now be described, by way of example, with reference to the accompanying drawings in which:

FIG. 1 shows schematically the circuit connections of the ring-main power system; and FIG. 2 shows schematically the circuit connections of a direct current power source forming part of the system.

Referring now to the drawing in FIG. 1, power sources 10, 11, 12 and 13 are four of a plurality of high voltage D.C. power sources connected to D.C. ring-mains A and B, and loads 14, and 15 and 16 are three of a plurality of loads connected to ring-main A and B. Each ring-main has a positive power line which is maintained at 250 kv. D.C. and a negative power line which is maintained at −250 kv. D.C. by the power sources, and a neutral line. Isolating switches 17 are connected between each power line and each power source and betwen each power line and each load.

High speed isolators 18, connected in the power lines adjacent the power sources and adjacent the loads are provided to electrically isolate sections of the power line from adjacent sections. No such isolators are provided between power sources such as 11 and 12 which are located at a single power station. The distance between the other power sources and the loads may be several miles.

In FIG. 2, a typical D.C. power source 11 is supplied with power from A.C. busbars energized by an alternator (not shown). Four convertor transformers 19 are connected between the A.C. busbar and four convertor valve groups 20. The valve groups are connected together in series, and to the power lines as shown. A neutral connection 21 is provided at the junction between the centre two valve groups, the neutral connection being connected to an earthing point.

In operation, the D.C. power sources are normally arranged so that each ring-main is carrying approximately the same load. Thus, for example, sources 10 and 11 may be connected to supply power to the positive and negative lines in ring-main A, the respective isolators 17 connecting these sources to ring-main B being open, and the sources 12 and 13 may be connected to supply power to the positive and negative lines in ring-main B. Change-over of the power sources from one ring-main to supply the other ring-main is normally carried out "off-load" by biassing the convertor valve groups to their non-conductive states.

In the event of an electrical fault in one or more of the power lines of the ring-mains, control of the valve groups of all the affected power sources will automatically be adjusted by protective devices, not shown, so as to bias or "block" these valve groups and prevent any of the power sources supplying power to the fault. The aforementioned protective devices are arranged to effectively locate the electrical fault or faults and provide signals to appropriate high speed isolators 18 whereby to disconnect and isolate any section of the ring-main to which a fault has occurred from the power sources supplying that ring-main.

After such a faulty section has been isolated the protective devices then control the blocked valve groups so that the power sources may again supply power to the power lines. The period for which the supply of power to an unfaulted power line in the faulty ring-main is interrupted may be less than about 15 milliseconds.

In the event of more than one fault occurring in a power line, an unfaulted power line in the same ring-main may continue to receive power from the D.C. sources by using the neutral line; that is, a power circuit is completed through the neutral line. In this event the power available in that ring-main will be reduced to approximately 50% of the normal power. In the system described having two ring-mains this represents approximately a 25% loss of available overall power in the power system.

The provision of a neutral power line is not essential and in the absence of this line, then, in the event of the positive or negative power line developing a fault an "earth return" may be used; that is, the power circuit is completed through the earth connection at respective direct current sources.

Since the power lines become charged in use, opening of the high speed isolators immediately the power supply from the sources has been blocked may cause severe damage to these isolators and in consequence it is advantageous to delay the opening of the high speed isolators momentarily to allow the power lines to partially discharge.

It will be appreciated that whereas power sources have been described as separate entities, the power sources may be arranged to operate in the manner of invertors so enabling power to be supplied to, or supplied from, the ring-mains by the so-called power sources depending on which of the two conditions is required.

I claim:
1. A D.C. power system comprising
two bi-polar ring mains each having positive, negative and neutral or earth-return connections,
a D.C. power source common to the two ring mains,
a D.C. load common to the two ring mains,
first switch means for separately coupling each connection in the two ring mains to said power source,
second switch means for separately coupling each connection in the two ring mains to said load, and
third switch means disposed in the positive and negative connections in each ring main in positions corresponding to one another and operable to isolate selected sections of each main.

2. A power system according to claim 1, comprising
control means operable to prevent the supply of power from said source to both ring mains prior to the isolation of a said section and immediately subsequent to its re-connection.

3. A power system according to claim 2, wherein said power source comprises
a converter set having a number of valve groups, said control means being operable to prevent the supply of power therefrom by biassing-off the valve groups in said set.

4. A power supply system according to claim 2, comprising
delay means for delaying the isolation of a said section by the third switch means following the operation of the control means.

5. A D.C. power system comprising
two bi-polar ring mains each having positive, negative and neutral connections,
a plurality of D.C. power sources spaced apart along, and common to, the two ring mains,
a plurality of D.C. loads spaced apart along, and common to, the two ring mains, both the sources and the loads comprising convertor sets,
first switch means associated with each power source for separately coupling each connection in the two ring mains to that power source,
second switch means associated with each load for separately coupling each connection in the two ring mains to that load, and
a plurality of high speed isolators connected in each ring main in positions corresponding to one another and operable to isolate selected sections of each ring main.

6. A D.C. power system according to claim 5, comprising
control means operable to prevent the supply of power from said sources to both ring mains prior to the isolation of a said section by the isolators and immediately subsequent to its re-connection, and wherein each of said source convertor sets comprises
a number of valve groups, the said control means being operable to prevent the supply of power therefrom by biassing-off the valve groups in said set.

7. A D.C. power system according to claim 6, comprising delay means for delaying the isolation of a said section by the third switch means for a predetermined period following the operation of said control means.

(References on following page)

References Cited

UNITED STATES PATENTS

| | | | |
|---|---|---|---|
| 1,912,918 | 6/1933 | Rossman | 307—147 |
| 2,525,527 | 10/1950 | Dannenberg | 317—16 X |

OTHER REFERENCES

Sandard Handbook for Electrical Engineers, Knowlton, A. E., Sections 13-6 and 13-228, 1949.

ROBERT K. SCHAEFER, Primary Examiner

H. J. HOHAUSER, Assistant Examiner

U.S. Cl. X.R.

307—43, 64, 85